(12) United States Patent
Blanchard et al.

(10) Patent No.: US 9,476,518 B2
(45) Date of Patent: Oct. 25, 2016

(54) VALVE ASSEMBLY AND METHOD

(71) Applicant: Marshall Excelsior Company, Marshall, MI (US)

(72) Inventors: Frederick W. Blanchard, Battle Creek, MI (US); Nathan H. Coy, Mason, MI (US)

(73) Assignee: MARSHALL EXCELSIOR CO., Marshall, MI (US)

( * ) Notice: Subject to any disclaimer, the term of this patent is extended or adjusted under 35 U.S.C. 154(b) by 522 days.

(21) Appl. No.: 13/744,599

(22) Filed: Jan. 18, 2013

(65) Prior Publication Data

US 2013/0181153 A1 Jul. 18, 2013

Related U.S. Application Data

(60) Provisional application No. 61/587,821, filed on Jan. 18, 2012.

(51) Int. Cl.
*F16K 31/524* (2006.01)
*F16K 41/00* (2006.01)

(52) U.S. Cl.
CPC .............. *F16K 31/524* (2013.01); *F16K 41/00* (2013.01); *Y10T 137/0491* (2015.04)

(58) Field of Classification Search
CPC .... F16J 15/186; F16J 15/189; F16K 31/524; F16K 41/00; Y10T 137/0491
USPC .................. 251/214, 257; 267/168
See application file for complete search history.

(56) References Cited

U.S. PATENT DOCUMENTS

| | | | | |
|---|---|---|---|---|
| 2,887,123 A * | 5/1959 | Becker | ...................... | 137/505.11 |
| 3,631,893 A | 1/1972 | Seaman | | |
| 3,682,490 A * | 8/1972 | Lunt | .............................. | 277/529 |
| 3,747,629 A * | 7/1973 | Bauman | ........................ | 137/270 |
| 3,762,442 A * | 10/1973 | Paul | ............................ | 137/625.2 |
| 3,862,751 A * | 1/1975 | Schwaller | ........................ | 267/91 |

(Continued)

FOREIGN PATENT DOCUMENTS

WO 2010042277 A1 4/2010

OTHER PUBLICATIONS

Fisher Controls International, LLC Instruction Manual, *Type C404-32 Internal Valves*, Jan. 2002, 12 pages.

(Continued)

*Primary Examiner* — Craig Schneider
*Assistant Examiner* — Frederick D Soski
(74) *Attorney, Agent, or Firm* — Howard & Howard Attorneys PLLC (57) ABSTRACT

A valve assembly includes a housing defining a cavity and a bore which opens into the cavity. A valve member is disposed in the cavity. The valve member moves between an open position for allowing fluid flow through the housing and a closed position for preventing fluid flow through the housing. An actuator extends through the bore for moving the valve member between the open and closed positions. A packing is positionable in the bore to provide a seal about the actuator for preventing fluid from exiting the housing through the bore. The packing is ejectable from the bore. The valve assembly includes a first and second biasing member. The first biasing member is configured to apply a first force to the packing to provide the seal. The second biasing member is configured to apply a second force to the packing for ejecting the packing from the bore.

17 Claims, 5 Drawing Sheets

(56) References Cited

U.S. PATENT DOCUMENTS

| | | | | |
|---|---|---|---|---|
| 3,935,626 | A | * | 2/1976 | Genbauff ............... 29/890.128 |
| 3,944,196 | A | * | 3/1976 | Schwartzkopf ............... 267/4 |
| 4,186,914 | A | * | 2/1980 | Radwill et al. ............... 267/4 |
| 4,333,403 | A | * | 6/1982 | Tack et al. ............... 105/197.05 |
| 4,509,473 | A | * | 4/1985 | Hamparian ............... 123/188.17 |
| 5,014,004 | A | * | 5/1991 | Kreibich et al. ......... 324/755.05 |
| 5,203,546 | A | * | 4/1993 | Amadore ............... 267/168 |
| 6,062,570 | A | * | 5/2000 | Erickson ............... 277/529 |
| 7,969,170 | B2 | * | 6/2011 | Kazama ............... 324/754.01 |
| 8,256,462 | B2 | | 9/2012 | Lin et al. |
| 2007/0001356 | A1 | * | 1/2007 | Adoline et al. ............... 267/168 |
| 2008/0036128 | A1 | * | 2/2008 | Uehara ............... 267/290 |
| 2008/0047616 | A1 | * | 2/2008 | Lovell et al. ............ 137/315.28 |
| 2010/0084594 | A1 | | 4/2010 | Lin et al. |
| 2010/0084596 | A1 | | 4/2010 | Lin et al. |

OTHER PUBLICATIONS

Fisher Controls International, LLC Product Bulletin, *Packing Selection Guidelines for Fisher® Sliding-Stem Valves*, May 2011, 8 pages.

Fisher Controls International, LLC Replacement Parts Sheet, *Type C407-10*, Nov. 2004, 2 pages.

Fisher Controls International, LLC Replacement Parts Sheet, *Type C404-32 Internal Valve Parts Sheet*, Jan. 2005, 2 pages.

Fisher Controls International, LLC Product Bulletin, *Sliding-Stem Packing Selection*, May 2011, 8 pages.

* cited by examiner

VALVE ASSEMBLY AND METHOD

CROSS-REFERENCE TO RELATED APPLICATIONS

The subject patent application claims priority to and all the benefits of U.S. Provisional Patent Application No. 61/587,821 which was filed on Jan. 18, 2012, which is hereby expressly incorporated herein by reference.

BACKGROUND OF THE INVENTION

1. Field of the Invention

The present invention relates to a valve assembly for transferring fluid.

2. Description of the Related Art

Valve assemblies, such as those for transferring fluid, are known in the art. One type of valve assembly includes a housing defining a cavity. A valve member is movable within the housing for controlling fluid transfer. The housing defines a bore which opens into the cavity. An actuation device is typically disposed through the bore for moving the valve member between an open position for enabling fluid transfer and closed position for preventing fluid transfer through the housing. Such valve assemblies generally include a valve packing which is positioned in the bore to provide a seal about the actuation device. The valve packing prevents fluid from inadvertently exiting the housing through the bore.

As the valve packing ages or wears, fluid may leak through the bore. In such instances, the valve packing requires replacement. Tools, such as a packing hook, are conventionally utilized to remove the valve packing from within the bore. Conventional methods of removing the valve packing are cumbersome and time consuming. Therefore, there remains an opportunity to improve removal of valve packing from the valve assembly.

SUMMARY OF THE INVENTION

The present invention provides a valve assembly which includes a housing defining a cavity and a bore which opens into the cavity. A valve member is disposed in the cavity. The valve member moves between an open position for allowing fluid flow through the housing and a closed position for preventing fluid flow through the housing. An actuator extends through the bore for moving the valve member between the open and closed positions. A packing is positionable in the bore to provide a seal about the actuator for preventing fluid from exiting the housing through the bore. The packing is ejectable from the bore. The valve assembly includes a first biasing member configured to apply a first force to the packing to provide the seal. The valve assembly further includes a second biasing member configured to apply a second force to the packing for ejecting the packing from the bore.

Additionally, the present invention provides a method of removing a packing from a valve assembly. The valve assembly includes a housing defining a cavity and a bore which opens into the cavity. The housing has a retainer end that defines an end of the bore. A valve member is disposed in the cavity and an actuator extends through the bore for moving the valve member. The packing is positionable in the bore to provide a seal about the actuator. A biasing member is configured to eject the packing beyond the retainer end of the housing. A retainer is releaseably attached to the retainer end of the housing to hold the packing in the housing. The method includes the step of removing the retainer from the housing such that the biasing member ejects the packing beyond the retainer end of the housing. Additionally, the method includes the step of grasping the packing ejected by the biasing member.

Accordingly, the valve assembly and method provide effective removal of the packing from the bore of the valve assembly. The second biasing member is configured to eject the packing from the bore to remove all of the packing easily from within the bore. As such, removal of the packing is not cumbersome or time consuming. Additionally, the valve member advantageously employs the second biasing member for safely ejecting the packing beyond the retainer end of the housing. Furthermore, the second biasing member allows the packing to be replaced back within the bore using less compression force when reattaching the retainer to the housing.

BRIEF DESCRIPTION OF THE DRAWINGS

Advantages of the present invention will be readily appreciated, as the same becomes better understood by reference to the following detailed description, when considered in connection with the accompanying drawings, wherein.

DETAILED DESCRIPTION OF THE INVENTION

Referring to the Figures, wherein like numerals indicate like or corresponding parts throughout the several views, a valve assembly is generally shown at 10. The valve assembly 10 is utilized to manipulate fluid transfer. The fluid can be liquid petroleum gas (LP-Gas), anhydrous ammonia ($NH_3$) or any other suitable fluid.

The valve assembly 10 is typically mounted to a tank (not shown) storing the fluid. The valve assembly 10 may be mounted to an inlet or outlet of the tank for filling or withdrawing fluid from the tank. The valve assembly 10 may also be mounted to inlets or outlets of transport truck tanks. Any suitable method may be utilized to secure the valve assembly 10 to the tank.

Figure 1:
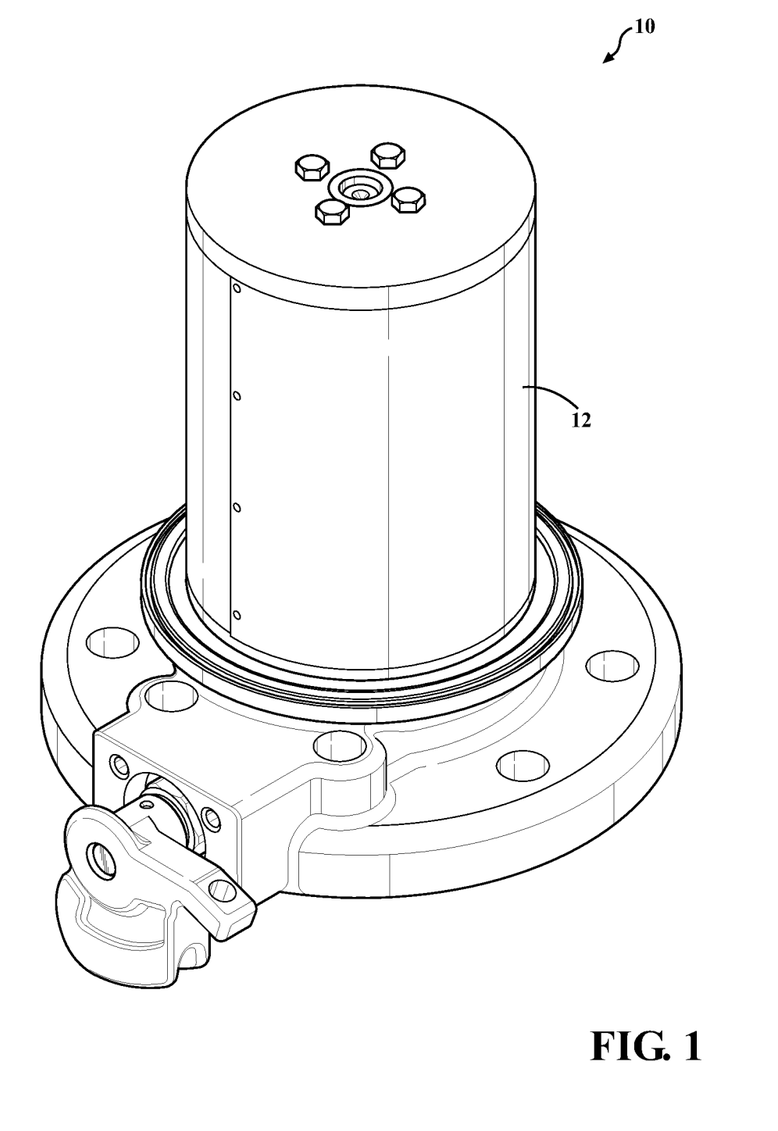
FIG. 1 is a perspective view of a valve assembly.
Figure 2:
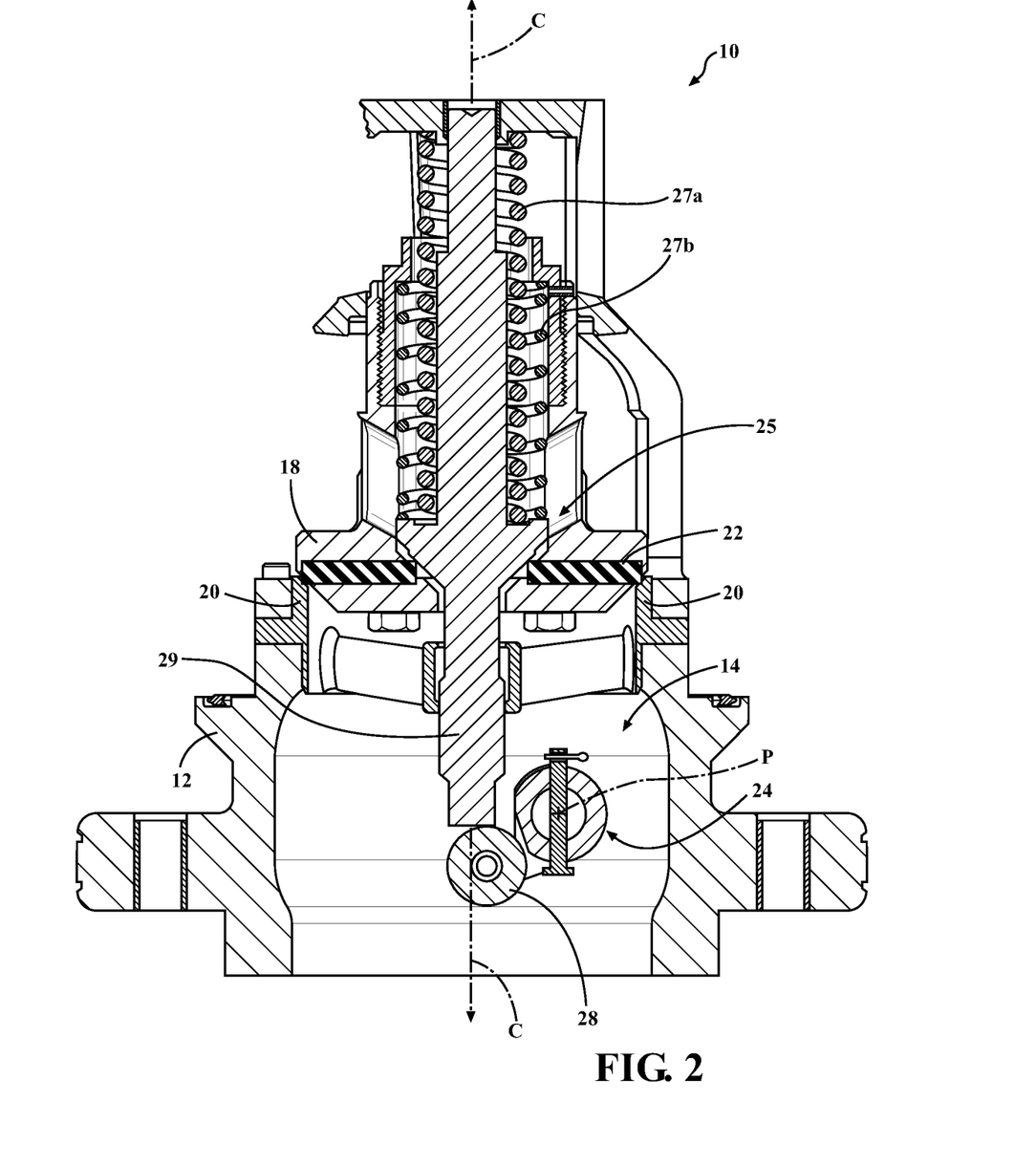
FIG. 2 is a cross sectional view of the valve assembly defining a cavity and having a valve member disposed in the cavity and in a closed position.
Figure 3:
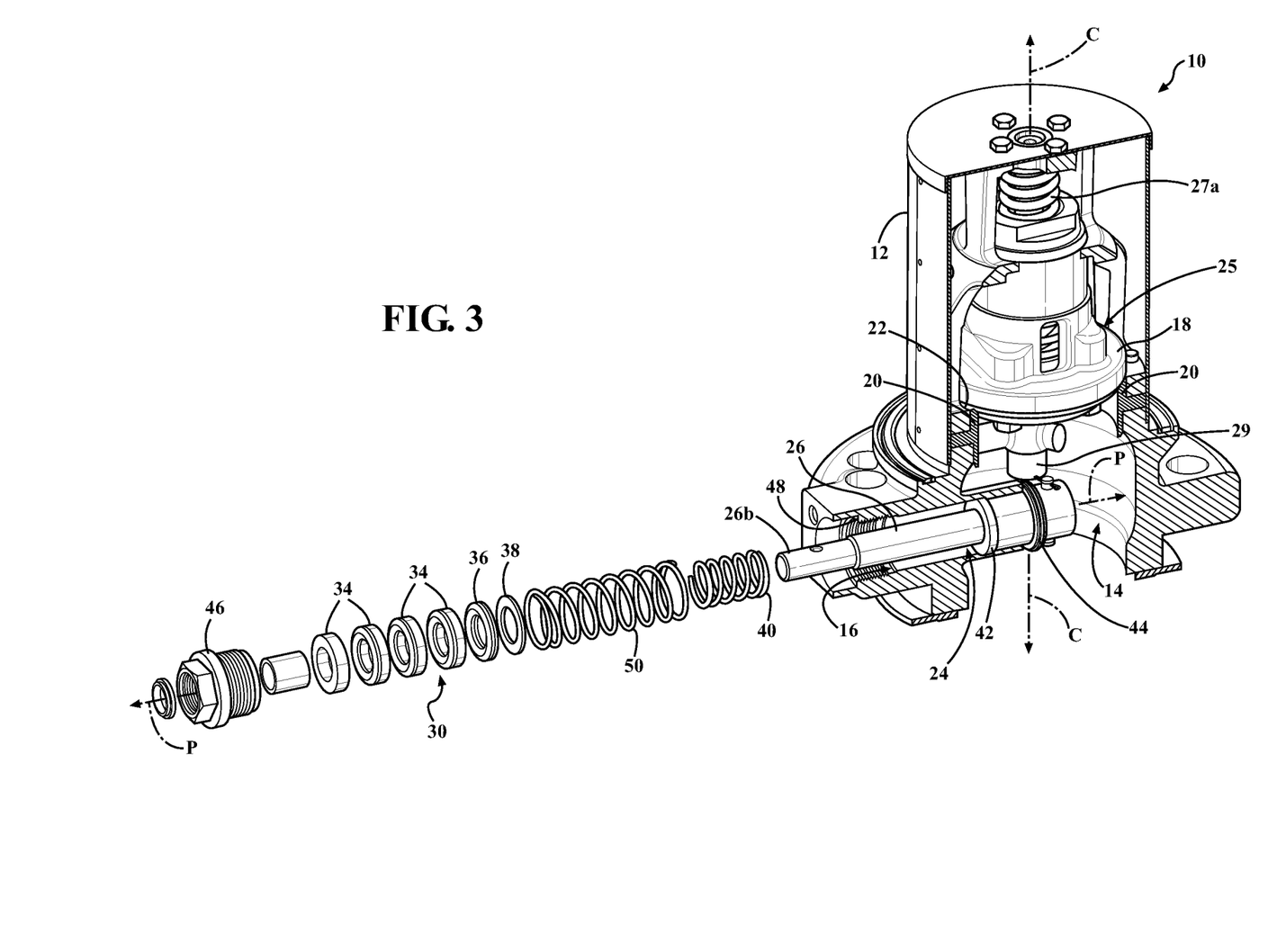
FIG. 3 is a partial exploded cross sectional view of the valve assembly.

Referring to FIGS. 1 and 2, the valve assembly 10 includes a housing 12. The housing 12 defines a cavity 14. The cavity 14 extends along a central axis C. As shown in FIG. 3, the housing 12 further defines a bore 16 which opens into the cavity 14. The cavity 14 and the bore 16 are adjacent each other such that fluid passing through the cavity 14 may reach the bore 16. In one embodiment as shown in FIG. 3, the bore 16 extends along a pivot axis P which is transverse to the central axis C.

As shown in FIGS. 2 and 3, the valve assembly 10 includes a main valve member 18. The main valve member 18 is disposed in the cavity 14. Generally, the main valve member 18 controls fluid flow through the housing 12. The main valve member 18 is moveable between an open position and a closed position. In the open position, the main valve member 18 allows fluid flow through the housing 12. In the closed position, as shown in FIGS. 2 and 3, the main valve member 18 prevents fluid flow through the housing 12. Generally, the main valve member 18 moves along the central axis C. The main valve member 18 may be known in the art as a poppet valve.

In one embodiment, the housing 12 includes a shoulder 20 and the main valve member 18 includes a valve seal 22. In the closed position, the valve seal 22 engages and seals against the shoulder 20 for preventing fluid flow through the housing 12. In the open position, the valve seal 22 is spaced from the shoulder 20 for enabling fluid flow through the housing 12. The valve member configuration as shown in FIGS. 2 and 3 is not intended to limit the scope of the present invention. As such, the present invention may employ valve members having configurations other than the configuration shown and described herein.

Referring to FIGS. 3-6, the valve assembly 10 further includes an actuator 24 extending through the bore 16 for moving the main valve member 18 between the open and closed positions. In one embodiment, the actuator 24 includes a shaft 26 extending through the bore 16 and into the cavity 14 of the housing 12. The shaft 26 is rotatable in the bore 16 about the pivot axis P between an initial position and a final position.

As shown in FIG. 2, the actuator 24 may include a cam 28 coupled to the shaft 26 for engaging a pilot valve member 25 coupled to the main valve member 18 by valve springs 27a, 27b. The pilot valve member 25 includes a pilot valve stem 29 and the cam 28 engages the pilot valve stem 29. The pilot valve member 25 configuration is conventional for actuating the main valve member 18 of internal valves, such as shown in FIG. 2.

Figure 4:
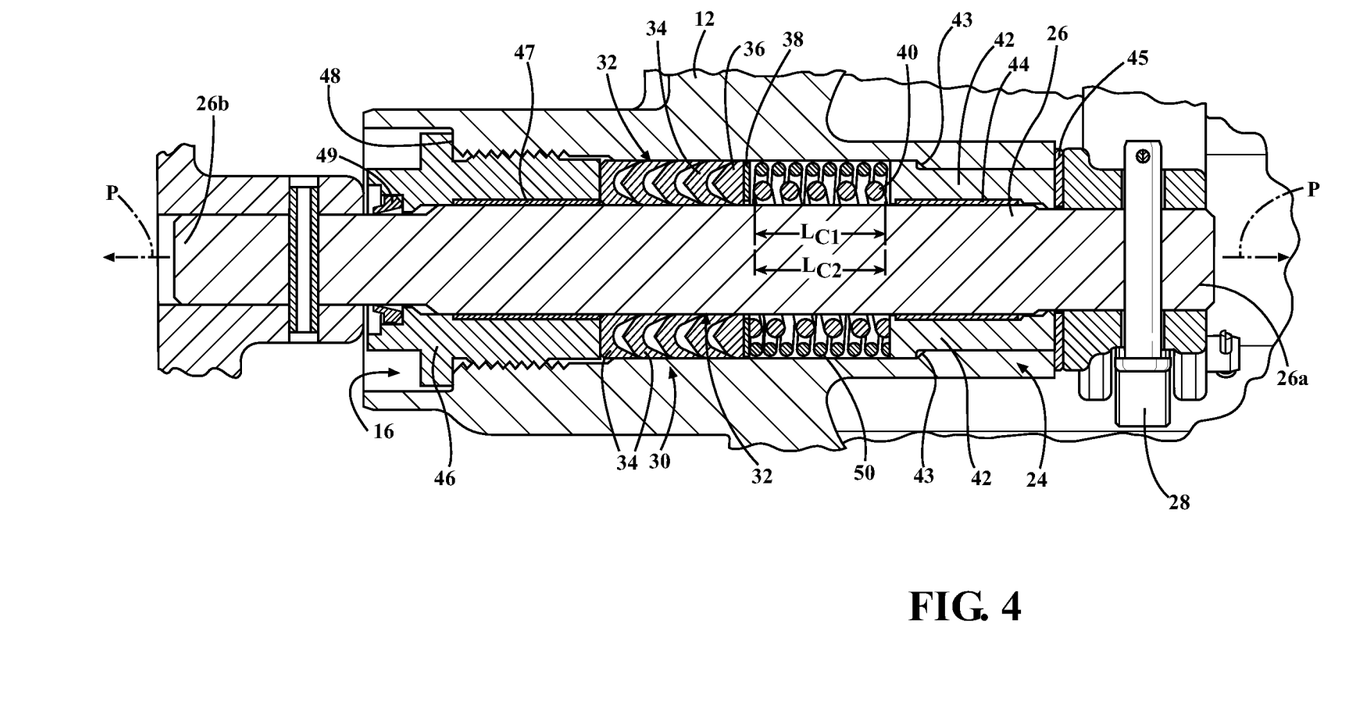
FIG. 4 is an enlarged cross sectional view of a first biasing member applying a force to a packing to provide a seal about an actuator within a bore of the valve assembly.

The cam 28 rotates with the shaft 26 about the pivot axis P between the initial and final positions. The shaft 26 includes a first end 26a and a second end 26b spaced from each other along the pivot axis P. The first end 26a is disposed near the cavity 14. The cam 28 is typically mounted to the first end 26a of the shaft 26, as shown in FIG. 4. The shaft 26 and the cam 28 are rotatable such that rotation of the shaft 26 causes rotation of the cam 28 for engaging the pilot valve stem 29. The actuator 24 may further include a handle (not shown) coupled to the shaft 26. The handle is actuated to rotate the shaft 26 between the initial and final positions to actuate pilot valve member and ultimately the main valve member 18. In particular, when actuated, the cam 28 engages the pilot valve stem 29 and pushes the pilot valve member 25 upwardly against the bias of the valve springs 27a, 27b to open a pilot bleed. Thereafter, upon further actuation and rotation of the cam 28, the main valve member 18 is lifted off the valve seat 20. The actuator configuration as shown in FIGS. 3-6 is not intended to limit the scope of the present invention. As such, the present invention may employ actuators having configurations other than the configuration shown and described herein.

As shown in FIGS. 3-6, the valve assembly 10 includes a packing 30 positionable in the bore 16. The packing 30 provides a seal 32 about the actuator 24 for preventing fluid from exiting the housing 12 through the bore 16. Generally, the packing 30 provides the seal 32 between a portion of the housing 12 defining the bore 16 and the actuator 24. In one embodiment, the packing 30 is disposed coaxially with respect to the actuator 24 and the pivot axis P. In such instances, the packing 30 provides the seal 32 generally 360 degrees about the actuator 24. More specifically, the packing 30 may be positionable between the first and second ends 26a, 26b of the shaft 26 of the actuator 24 and disposed entirely around a portion of the shaft 26 for providing the seal 32. The packing 30 may provide the seal 32 with respect to the actuator 24 according to various other embodiments not specifically described herein without departing from the scope of the present invention.

In one embodiment, as shown in FIGS. 3-6, the packing 30 includes a plurality of rings 34 stacked against each other. As illustrated in FIG. 4, each of the rings 34 generally defines a u-shaped cross sectional configuration. The packing 30 may further include a wedge 36 and a washer 38. The wedge 36 is disposed between one of the rings 34 and the washer 38. The wedge 36 is configured to abut one of the rings 34 and the washer 38 is configured to abut the wedge 36. In this embodiment, the rings 34, the wedge 36, and the washer 38, function to provide the seal 32, as will be discussed further below. The packing 30 may include other configurations without departing from the scope of the present invention.

The packing 30 is ejectable from the bore 16. Generally, the packing 30 is moveable through the bore 16 along the pivot axis P. The packing 30 may be ejected from the bore 16 generally for purposes of replacing the packing 30 in the event the packing 30 becomes worn or damaged. However, the packing 30 may be ejected for other purposes not specifically described herein.

A first biasing member 40 applies a first force to the packing 30 to provide the seal 32. The first biasing member 40 is generally disposed in the bore 16 coaxially with respect to the pivot axis P. In one embodiment, the first biasing member 40 may be disposed coaxially with respect to the shaft 26 between the first and second ends 26a, 26b of the shaft 26. The first biasing member 40 may be further defined as a coil spring, such as a compression spring. However, the first biasing member 40 may have other configurations without departing from the scope of the invention.

The valve assembly 10 may include a seat 42 coupled to the actuator 24. More specifically, the seat 42 is disposed about the shaft 26 between the first and second ends 26a, 26b. The first biasing member 40 is disposed between the seat 42 and the packing 30. In one embodiment, the seat 42 is axially fixed in position in the bore 16 and is configured to remain stationary in relation to rotation of the shaft 26 about the pivot axis P. The housing 12 defines a shoulder 43 which extends radially into the bore 16 towards the pivot axis P. The seat 42 bears against the shoulder 43 of the housing 12 such that the seat 42 is axially fixed in position and is prevented from laterally moving along the pivot axis P in the bore 16. A seat bushing 44 may be disposed between the seat 42 and the shaft 26 for preventing wear between the seat 42 and the shaft 26. The seat bushing 44 can be a Rulon® bushing or any other suitable bushing. The valve assembly 10 may include a pad 45 disposed about the shaft 26 between the cam 28 and the seat 42 to allow relative rotation therebetween. The pad 45 abuts the seat 42 and is disposed in the cavity 14 adjacent the bore 16. The pad 45 can be formed of any suitable material, such as Teflon®.

The first biasing member 40 is moveable and expandable along the pivot axis P and operates between a compressed position and an at-rest position. The first biasing member 40 is in the compressed position in FIG. 4 and the at-rest position in FIGS. 5 and 6. The first biasing member 40 may be compressed between the packing 30 and the seat 42 in the compressed position. The first biasing member 40 has a first compression length $L_{C1}$ in the compressed position. In the at-rest position, the first biasing member 40 is generally uncompressed. The first biasing member 40 defines a first length at-rest $L_{R1}$ in the at-rest position. The first compression length $L_{C1}$ is less than the first length at-rest $L_{R1}$.

As discussed, the first biasing member 40 applies the first force to the packing 30. In one embodiment, the first biasing member 40 abuts the seat 42 for applying the first force to the packing 30 such that the packing 30 provides the seal 32. Since the seat 42 is fixed axially in position, the seat 42 does not move under the first force of the first biasing member 40. Instead, the seat 42 provides an abutment surface for the first biasing member 40. In applying the first force to the packing 30, the first biasing member 40 enables the rings 34 to expand for creating the seal 32 between the shaft 26 and the portion of the housing 12 defining the bore 16. Specifically, the first biasing member 40 engages the washer 38 to urge the washer 38 toward the rings 34 along the pivot axis P. In turn, the washer 38 urges the wedge 36 toward the rings 34 along the pivot axis P. Thereafter, the wedge 36 is urged into and presses against the u-shaped cross-section of one ring 34, which urges and presses that ring 34 into the u-shaped cross-section of the next ring 34, and so on. As such, the u-shaped cross-sections of the rings 34 expand thereby urging the rings 34 against the shaft 26 and against the portion of the housing 12 defining the bore to prevent fluid from leaking through the bore 16.

As shown in FIGS. 3-6, the valve assembly 10 may include a retainer 46 releaseably attached to the housing 12 for holding the packing 30 in the bore 16. More specifically, the retainer 46 holds the packing 30 against the first force such that the packing 30 creates the seal 32. The retainer 46 holds the first biasing member 40 in the compressed position. In one embodiment, the retainer 46 is configured to abut one of the rings 34 of the packing 30. When the retainer 46 is attached to the housing 12, the packing 30 is disposed between the first biasing member 40 and the retainer 46. The retainer 46 is coaxially disposed about the actuator 24 along the pivot axis P. Specifically, the retainer 46 is disposed adjacent the second end 26b of the shaft 26 of the actuator 24. During rotation of the shaft 26, the retainer 46 remains stationary, i.e., does not rotate about the pivot axis P. As such, a retainer bushing 47 is disposed between the retainer 46 and the shaft 26 for preventing wear between the retainer 46 and the shaft 26. The retainer bushing 47 can be a Rulon® bushing or any other suitable bushing.

The housing 12 has a retainer end 48 that defines an end of the bore 16. The retainer 46 is releasably attached to the housing 12 at the retainer end 48 of the housing 12. In various embodiments, the retainer 46 is threadably attached near the retainer end 48. In such instances, the retainer 46 may be rotated about the pivot axis P to threadably attach or detach the retainer 46 to or from the housing 12. Generally, the retainer 46 is detached from the housing 12 to remove and/or replace various components of the valve assembly 10, such as the packing 30. The retainer 46 may include a retainer seal 49 disposed about the shaft 26 for abutting the shaft 26 for creating an annular seal between the retainer 46 and the shaft 26. The retainer seal 49 may be flexible and formed of any suitable material.

Referring to FIGS. 3-6, the valve assembly 10 further includes a second biasing member 50. The second biasing member 50 applies a second force to the packing 30 for ejecting the packing 30 from the bore 16. For example, it is desirable to eject the packing 30 to remove and/or replace the packing 30 when the fluid is leaking through the bore 16, or for regular service or maintenance.

Figure 5:
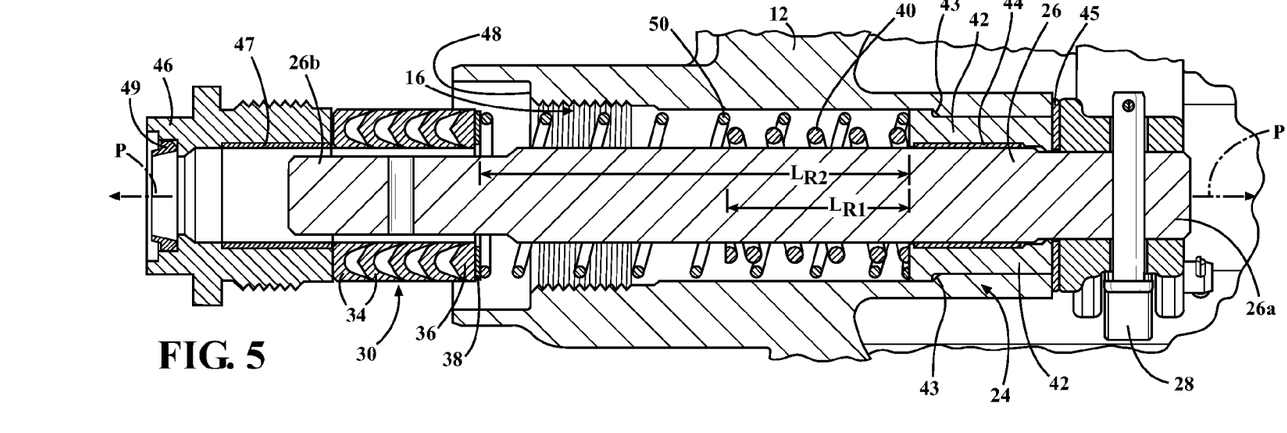
FIG. 5 is a cross sectional view of a second biasing member of the valve assembly ejecting the packing from the bore.
Figure 6:
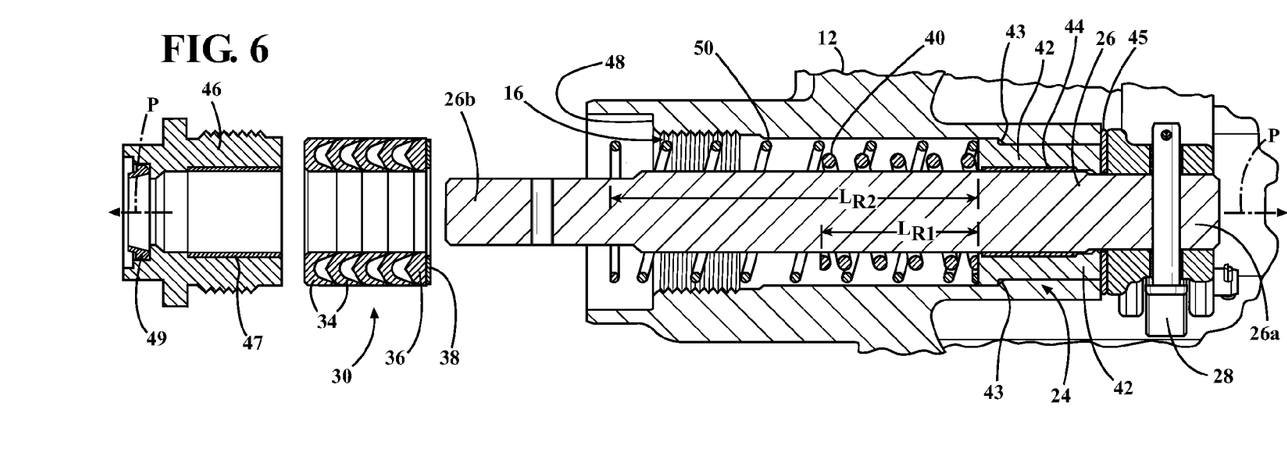
FIG. 6 is a cross sectional view of the first and second biasing members being in an at-rest position with the packing being ejected from the bore.

The second biasing member 50 is generally disposed in the bore 16 coaxially with respect to the pivot axis P. In one embodiment, the second biasing member 50 is disposed coaxially with respect to the shaft 26 between the first and second ends 26a, 26b of the shaft 26. In another embodiment, as shown in FIGS. 5 and 6, the second biasing member 50 is disposed coaxially around the first biasing member 40. In other words, the first biasing member 40 is disposed within the second biasing member 50. In yet another embodiment, the first biasing member 40 is disposed coaxially around the second biasing member 50. In other words, the second biasing member 50 is disposed within the first biasing member 40. The second biasing member 50 may be further defined as a coil spring, such as a compression spring. However, the second biasing member 50 may have other configurations without departing from the scope of the invention.

In one embodiment, the second force applied by the second biasing member 50 is less than the first force applied by the first biasing member 40. For example, the second biasing member 50 may exhibit a weaker spring constant than the first biasing member 40. The second force is weaker than the first force for allowing the packing 30 to be ejected from the bore 16 at a relatively low force. Mainly, in order to create the seal 32 effectively, the first force applied to the packing 30 should be relatively strong. If the packing 30 is ejected from the bore 16 according to the first force, the packing 30 may forcefully eject from the bore 16. Thus, the second biasing member 50 generally provides the second force for gently ejecting the packing 30 from the bore 16. Furthermore, the second force is weaker for allowing the second biasing member 50 to be easily compressed by hand when assembling or servicing the packing 30.

The second biasing member 50 is movable and expandable along the pivot axis P and operates between a compressed position and an at-rest position. FIG. 4 illustrates the second biasing member 50 in the compressed position and FIGS. 5 and 6 illustrate the second biasing member 50 in the at-rest position. Generally, the second biasing member 50 is compressed between the packing 30 and the seat 42 in the compressed position. The second biasing member 50 has a second compression length $L_{C2}$ in the compressed position. The second compression length $L_{C2}$ is the same as the first compression length $L_{C1}$ in the compressed position. In the at-rest position, the second biasing member 50 is generally uncompressed. The second biasing member 50 defines a second length at-rest $L_{R2}$ in the at-rest position. The second compression length $L_{C2}$ is less than the second length at-rest $L_{R2}$.

In addition, the second length at-rest $L_{R2}$ of the second biasing member 50 is greater than the first length at-rest $L_{R1}$ of the first biasing member 40. In other words, the second biasing member 50 is longer than the first biasing member 40 when the first and second biasing members 40, 50 are in the at-rest position. In one embodiment, the second length at-rest $L_{R2}$ is at least double the first length at-rest $L_{R1}$. In another embodiment, as shown in FIGS. 5 and 6, the second biasing member 50 has the second length at-rest $L_{R2}$ configured such that the packing 30 ejects beyond the retainer end 48 of the housing 12 such that the packing 30 may be grasped. In such instances, the packing 30 may eject partially or fully beyond the retainer end 48. As shown in FIG. 5, the second biasing member 50 is configured to space the packing 30 from the first biasing member 40. Mainly, having the second length at-rest $L_{R2}$ be greater than the first length at-rest $L_{R1}$ enables the second biasing member 50 to separate the packing 30 from the first biasing member 40 as the second biasing member 50 moves from the compression position to the at-rest position.

As discussed, the second biasing member 50 applies the second force to the packing 30. In one embodiment, the second biasing member 50 abuts the seat 42 for applying the second force to the packing 30 such that the packing 30 ejects from the bore 16. In applying the second force to the packing 30, the second biasing member 50 may engage the washer 38 of the packing 30. In turn, the second biasing member 50 urges the washer 38 along the pivot axis P to eject the packing 30 from the bore 16.

As shown in FIG. 4, the second biasing member 50 may further be configured to apply the second force to the packing 30 to provide the seal 32. In such instances, the first and second biasing members 40, 50 simultaneously apply the respective first and second forces to the packing 30 to provide the seal 32. The first and second forces in combination define a total force applied to the packing 30. Thus, when it is desired to apply a specific total force to the packing 30, the first and second biasing members 40, 50 may be configured such that respective first and second forces add up to the desired total force. In applying the second force to the packing 30, the second biasing member 50 may abut the seat 42 and engage the washer 38 of the packing 30 for expanding the rings 34 to create the seal 32 between the shaft 26 and the portion of the housing 12 defining the bore 16.

The operation of replacing the packing 30 will be discussed below. When the packing 30 needs replacement, the valve assembly 10 generally has the retainer 46 attached to the housing 12 and the main valve member 18 in the closed position to prevent the flow of the fluid. Next, the retainer 46 is detached from the retainer end 48 of the housing 12 and removed from the bore 16 and the shaft 26. When the retainer 46 is detached from the housing 12, the second biasing member 50 biases and ejects the packing 30 out of the bore 16 as shown in FIG. 5. In one embodiment, the second biasing member 50 ejects the packing 30 beyond the retainer end 48 of the housing 12. Thereafter, the packing 30 is ejected from the valve assembly 10 for replacement. The packing 30 is grasped and removed from the second end 38 of the shaft 26 once the packing 30 is ejected by the second biasing member 50. After the original packing 30 is grasped and removed, a replacement packing 30 can be positioned and disposed coaxially about the shaft 26 within the bore 16. Thereafter, the retainer 46 is re-attached to the housing 12 to hold the replacement packing 30 in the bore 16. Re-attaching the retainer 46 to the housing 12 compresses the first biasing member 40 such that the first biasing member 40 applies the first force to the replacement packing 30 such that the replacement packing 30 re-creates the seal 32 about the actuator 24.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention can be practiced otherwise than as specifically described.

What is claimed is:

1. A valve assembly comprising:
   a housing defining a cavity and a bore which opens into said cavity;
   a valve member disposed in said cavity and movable between an open position for allowing fluid flow through said housing and a closed position for preventing fluid flow through said housing;
   an actuator extending through said bore for moving said valve member between said open and closed positions;
   a seat coupled to said actuator;
   an expandable packing positionable in said bore and disposed coaxially about said actuator having a non-expanded position and an expanded position to provide a seal between said housing and said actuator for preventing fluid from exiting said housing through said bore, said packing being ejectable from said bore in said non-expanded position;
   a first biasing member disposed between and contacting said seat and said packing and configured to apply a first force to said packing to expand said packing to said expanded position and provide said seal; and
   a second biasing member disposed between and contacting said seat and said packing in a compressed position and configured to apply a second force to said packing for ejecting said packing in said non-expanded position from said bore in an ejected position.

2. The valve assembly of claim 1 wherein said second biasing member is configured to space said packing from said first biasing member in the ejected position.

3. The valve assembly of claim 1 wherein said second force is less than said first force.

4. The valve assembly of claim 1 including a retainer releaseably attached to said housing for holding said packing in said bore against said second force and with said packing being disposed between said second biasing member and said retainer.

5. The valve assembly of claim 1 wherein each of said first and second biasing members operate between a compressed position and an at-rest position, with said first biasing member having a first length at-rest and with said second biasing member having a second length at-rest, wherein said second length at-rest is greater than said first length at-rest.

6. The valve assembly of claim 5 wherein said second length at-rest is at least double said first length at-rest.

7. The valve assembly of claim 1 wherein said first and second biasing members are further defined as coil springs.

8. The valve assembly of claim 7 wherein said actuator includes a shaft extending through said bore, said first and second biasing members and said packing being positionable coaxially with respect to said shaft.

9. The valve assembly of claim 8 wherein said second biasing member is disposed coaxially around said first biasing member.

10. The valve assembly of claim 8 wherein said first biasing member is disposed coaxially around said second biasing member.

11. The valve assembly as set forth in claim 1 wherein said packing comprises a plurality of rings stacked against each other.

12. The valve assembly as set forth in claim 11 wherein said packing includes a washer and a wedge disposed between said washer and one of said rings.

13. A valve assembly comprising:
   a housing defining a cavity and a bore which opens into said cavity, said housing having a retainer end defining an end of said bore;
   a valve member disposed in said cavity and movable between an open position for allowing fluid flow through said housing and a closed position for preventing fluid flow through said housing;
   an actuator extending through said bore for moving said valve member between said open and closed positions;

a seat coupled to said actuator;

an expandable packing positionable in said bore and disposed coaxially about said actuator having a non-expanded position and an expanded position to provide a seal between said housing and said actuator for preventing fluid from exiting said housing through said bore, said packing being ejectable from said bore in said non-expanded position;

a first biasing member disposed between and contacting said seat and said packing and configured to apply a first force to said packing to expand said packing to said expanded position and provide said seal; and a second biasing member disposed between and contacting said seat and said packing and configured to eject said packing from said bore in said non-expanded position, said second biasing member operating between a compressed position and an at-rest position, wherein said second biasing member has a first length at-rest configured such that said packing ejects beyond said retainer end of said housing.

14. The valve assembly of claim 13 wherein said first biasing member operates between a compressed position and an at-rest position, with said first biasing member having a second length at-rest, wherein said first length at-rest is greater than said second length at-rest.

15. A method of removing a packing from a valve assembly, said method comprising the steps of:

providing the valve assembly with a housing defining a cavity and a bore which opens into the cavity with the housing having a retainer end defining an end of the bore, a valve member disposed in the cavity, an actuator extending through the bore for moving the valve member, a seat coupled to the actuator, an expandable packing disposed in the bore and disposed coaxially about the actuator having a non-expanded position and an expanded position to provide a seal between the housing and the actuator, a first biasing member disposed between and contacting the seat and the packing and configured to apply a first force to the packing to expand the packing to the expanded position and provide the seal, a second biasing member disposed between and contacting the seat and the packing and configured to eject the packing in the non-expanded position beyond the retainer end of the housing, and a retainer releaseably attached to the retainer end of the housing for holding the packing in the housing;

removing the retainer from the housing such that the second biasing member ejects the packing in the non-expanded position beyond the retainer end of the housing; and grasping the packing ejected by the second biasing member.

16. The method as set forth in claim 15 further comprising the step of positioning a replacement packing in the bore.

17. The method as set forth in claim 16 further comprising the step of attaching the retainer to the housing such that the replacement packing provides the seal about the actuator.

* * * * *